(12) United States Patent
Shen et al.

(10) Patent No.: US 10,607,155 B2
(45) Date of Patent: Mar. 31, 2020

(54) DIAGNOSING SLOW TASKS IN DISTRIBUTED COMPUTING

(71) Applicant: Intel Corporation, Santa Clara, CA (US)

(72) Inventors: Huanxing Shen, Shanghai (CN); Cong Li, Shanghai (CN); Tai Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 15/473,820

(22) Filed: Mar. 30, 2017

(65) Prior Publication Data

US 2018/0285766 A1 Oct. 4, 2018

(51) Int. Cl.
*G06N 20/00* (2019.01)
*H04L 29/08* (2006.01)
(Continued)

(52) U.S. Cl.
CPC ............. *G06N 20/00* (2019.01); *G06F 11/30* (2013.01); *G06N 5/046* (2013.01); *H04L 67/04* (2013.01);
(Continued)

(58) Field of Classification Search
CPC ........ G06F 11/30; G06N 5/003; G06N 5/043; G06N 7/005; G06N 20/00; H04L 67/04; H04L 67/10; H04L 67/12; H04L 67/2833
See application file for complete search history.

(56) References Cited

U.S. PATENT DOCUMENTS

| 7,590,620 B1 * | 9/2009 | Pike | G06F 11/1482 707/999.003 |
| 8,510,538 B1 * | 8/2013 | Malewicz | G06F 7/38 712/225 |

(Continued)

FOREIGN PATENT DOCUMENTS

| JP | 2009301298 A | 12/2009 |
| WO | 2015001850 A1 | 1/2015 |

OTHER PUBLICATIONS

Yadwadkar, Neeraja & Choi, Wontae, "Proactive Straggler Avoidance using Machine Learning", White Paper, University of California, Berkeley, 10 pages (Year: 2012).*

(Continued)

*Primary Examiner* — Scott A. Waldron
(74) *Attorney, Agent, or Firm* — Alliance IP, LLC

(57) ABSTRACT

Machine learning is utilized to analyze respective execution times of a plurality of tasks in a job performed in a distributed computing system to determine that a subset of the plurality of tasks are straggler tasks in the job, where the distributed computing system includes a plurality of computing devices. A supervised machine-learning algorithm is performed using a set of inputs including performance attributes of the plurality of tasks, where the supervised machine learning algorithm uses labels generated from determination of the set of straggler tasks, the performance attributes include respective attributes of the plurality of tasks observed during performance of the job, and applying the supervised learning algorithm results in identification of a set of rules defining conditions, based on the performance attributes of the plurality of tasks, indicative of which tasks will be straggler tasks in a job. Rule data is generated to describe the set of rules.

20 Claims, 8 Drawing Sheets

(51) Int. Cl.
*G06N 7/00* (2006.01)
*G06N 5/04* (2006.01)
*G06F 11/30* (2006.01)
*G06N 5/00* (2006.01)

(52) U.S. Cl.
CPC .............. *H04L 67/10* (2013.01); *H04L 67/12* (2013.01); *H04L 67/2833* (2013.01); *G06N 5/003* (2013.01); *G06N 7/005* (2013.01)

(56) References Cited

U.S. PATENT DOCUMENTS

| | | | |
|---|---|---|---|
| 9,392,060 B1* | 7/2016 | Rus | H04L 67/1097 |
| 9,424,074 B1 | 8/2016 | Pjesivac-Grbovic et al. | |
| 9,811,391 B1* | 11/2017 | Barrett | G06F 9/5083 |
| 10,157,085 B2* | 12/2018 | Gong | G06F 12/0813 |
| 2007/0027674 A1 | 2/2007 | Parson et al. | |
| 2016/0011901 A1* | 1/2016 | Hurwitz | G06F 9/4843 |
| | | | 718/101 |
| 2016/0098292 A1* | 4/2016 | Boutin | G06F 9/505 |
| | | | 718/104 |
| 2017/0006135 A1 | 1/2017 | Siebel et al. | |

OTHER PUBLICATIONS

Yadwadkar, Neeraja et al., "Wrangler: Predictable and Faster Jobs using Fewer Resources", ACM SoCC '14, 14 pages (Year: 2014).*
Yadwadkar, Neeraja et al., "Multi-Task Learning for Straggler Avoiding Predictive Job Scheduling", Journal of Machine Learning Research 17 (Published Jun. 2016), 37 pages (Year: 2016).*
Li, Cong et al., "Learning to Diagnose Stragglers in Distributed Computing", IEEE 2016 9th Workshop on MTAGS (Nov. 14, 2016), 6 pages (Year: 2016).*
Office Action for Canadian Patent Application No. CA2962999, dated Jan. 18, 2019, 4 Pages.
CIPO Office Action issued in CA Patent Application No. 2,962,999 dated Feb. 8, 2018 (2 pages).
Japanese Report of Notice of Allowance in JP 2017-071054 dated May 24, 2018, 4 pages.

* cited by examiner

DIAGNOSING SLOW TASKS IN DISTRIBUTED COMPUTING

TECHNICAL FIELD

This disclosure relates in general to the field of computer systems and, more particularly, to distributing computing diagnostics using machine learning.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase the opportunities to realize distributed computing systems, which may cooperate to realize increased computing power and new applications.

BRIEF DESCRIPTION OF THE DRAWINGS

Like reference numbers and designations in the various drawings indicate like elements.

DETAILED DESCRIPTION OF EXAMPLE EMBODIMENTS

Figure 1A:
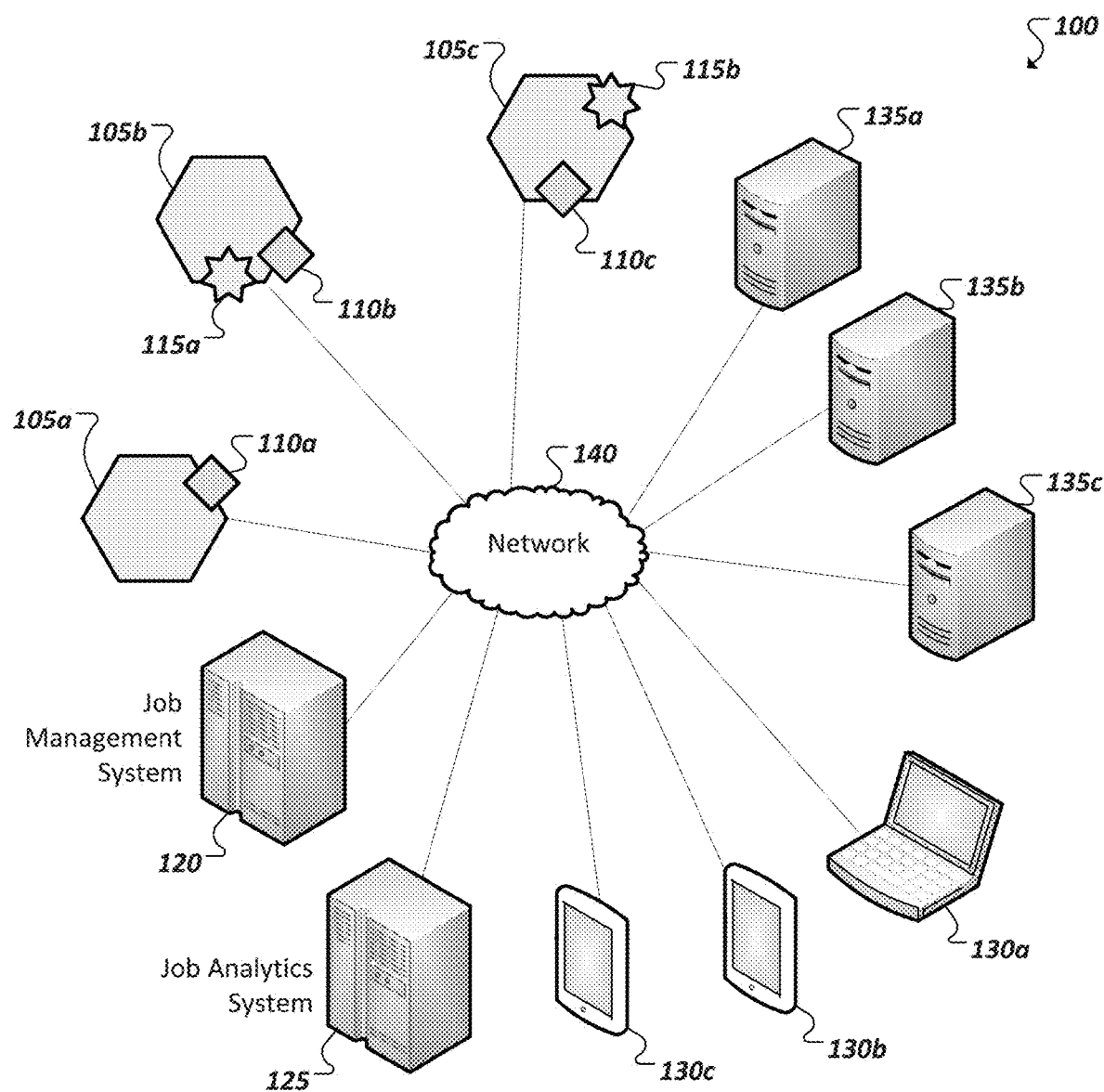
FIG. 1A illustrates an embodiment of a system including an example job analytics system.

FIG. 1A is a block diagram illustrating a simplified representation of a system 100 that includes computing devices (e.g., 105a-c, 135a-c, etc.), which may be used together in a distributed computing environment. The various computing devices may be instances of the same type of device or may be heterogeneous devices, which have the capability of connecting to and communicating with each other (e.g., over one or more networks 140) to realize a particular goal or purpose. A job management system 120 may be provided to orchestrate the coordination of computing devices within an example distributed computing system. In some cases, a device participating within the distributed computing system may provide the functionality of the job management system 120 (e.g., rather than the job management system being provided as a separate system), among other examples.

In some implementations, one or more jobs may be defined and provided to an example distributed computing system, with the job composed of a set of tasks, which may be distributed to individual devices within the distributed computing system for completion using the respective devices. In this manner, a single job may be processed and completed by multiple distinct devices operating in parallel, allowing the job to be completed more quickly or through more flexible utilization of computing devices in the system. User interfaces may be provided in connection with an example job management system 120 through which users (e.g., through user devices (e.g., 130a-c) may define jobs for execution by a distributed computing system. A job management system 120 may be further provided with functionality to allow the job management system 120 to have visibility into one or more of the specific computing devices, which may be included or utilized within a distributed computing system. The job management system 120 may define rules or settings based on this visibility in order to distribute the assignment of a job's tasks in accordance with what the job management system 120 (and/or its human user) perceive to be the relative availability of computing resources (e.g., processor, memory, I/O, network communications, and other resources which may be used to complete the tasks) on the various devices within the distributed computing system. This may result in some devices bearing heavy loads than others (in terms of the types and number of tasks they perform within a job).

In some cases, the assignment of tasks to a various devices in a distributed computing system may be suboptimal. For instance, the assignment of tasks may be based on false or imprecise assumptions of devices' computing capacity or the needs of various tasks designated within a job. In some instances, such inefficiencies and flaws may be difficult to ascertain. In some implementations, a job analytics system 125 that is equipped with functionality to analyze the performance of a job by a particular distributed computing system to diagnose issues with the performance of the job. For instance, some tasks within the job may take longer to complete than others, acting as "stragglers" delaying the ultimate conclusion of the job. In some implementations, a job analytics system 125 may be equipped with machine learning functionality to accept performance data describing the performance of job by distributed computing devices to derive diagnostic results, which may be used to improve or enhance the task assignment and other job management functions of job management systems (e.g., 120), among other examples.

Distributed computing systems may be composed of a variety of different devices. In some implementations, tasks of a particular job may be distributed (e.g., evenly or unevenly based on capacity) between multiple server systems (e.g., 135a-135c). In some instances, such systems (e.g., 135a-135c) may be equipped with computing resources dedicated and provided solely for use in handling various tasks of various jobs managed by an example job management system 120. In other cases, server systems (e.g., 135a-135c) may include systems whose primary purpose or workload is defined outside of the jobs delegated to a distributed computing system. In such examples, the server system may make available any excess computing resources it has after servicing its primary purpose for use within a distributed computing system and handling a subset of the tasks defined within jobs executed by the distributed computing system. Indeed, in some instances, general-purpose or purpose-built computing devices may both serve a primary role (e.g., within a particular network or environment), but be made available (when capacity is available at the device) to handle tasks of a jobs to be executed by a distributed computing environment. Such devices may include, for instance, user computing devices (e.g., 130a-130c), sensor or Internet of Things (IoT) endpoint devices (e.g., 105a-105c), other edge computing devices, among other examples. It should be further appreciated that distributed computing systems may be potentially composed of a heterogeneous mix of different devices including devices (e.g., 105a-105c, 130a-130c, 135a-135c, etc.) shown and described in the example of FIG. 1, among other different example systems.

In the case of edge devices, it is anticipated that millions of sensor devices and actuator devices may be deployed, each provided with computing resources which may be devoted primarily to special purpose functions (such as specific functions within corresponding IoT systems), but may also be harnessed and aggregated to assist in the performance of various jobs within a distributed computing system. This may be particularly beneficial, for instance, when the job involves processing of data local to, generated by, or otherwise readily available to these same endpoint devices or jobs that relate to the device's larger IoT solution, among other examples.

In some implementations, edge devices (e.g., 105a-c) may include a computer processor and/or communications module to allow each device 105a-c to interoperate with one or more other devices (e.g., 105a-c) or systems in the environment. Each device can further include one or more instances of various types of sensors (e.g., 110a-c), actuators (e.g., 115a-b), storage, power, computer processing, and communication functionality which can be leveraged and utilized (e.g., by other devices or software) within a machine-to-machine, or Internet of Things (IoT) system or application. In some cases, inter-device communication and even deployment of an IoT application may be facilitated by one or more gateway devices (e.g., 150) through which one or more of the devices (e.g., 105a-c) communicate and gain access to other devices and systems in one or more networks (e.g., 140). The same communications facilities may be leveraged to allow the devices' (e.g., 105a-c) participation in a distributed computing device (e.g., managed by a job management system 120).

Sensors, or sensor assets, of example edge devices (e.g., 105a-c) may be capable of detecting, measuring, and generating sensor data describing characteristics of the environment in which they reside, are mounted, or are in contact with. For instance, a given sensor (e.g., 110a-c) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110a-c) as described herein, anticipate the development of a potentially limitless universe of various sensors, each designed to and capable of detecting, and generating corresponding sensor data for, new and known environmental characteristics. Actuators (e.g., 115a-b) can allow the device to perform some kind of action to affect its environment. For instance, one or more of the devices (e.g., 105a,c) may include one or more respective actuators (e.g., 115a-b) that accepts an input and perform its respective action in response. In some cases, instead of using and reacting to raw sensor data generated by the sensor devices, actuators may act on results generated from the intermediate processing of this sensor data. In some instances, the processing of sensor data may be implemented as jobs processed by a distributed computing system. Accordingly, in some instances, distributed computing jobs may generate results that are provided to actuators of devices within an example IoT system (among a variety of other example applications). Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-c), such as devices sourced or controlled by varied groups of entities and employing varied hardware, operating systems, software applications, and technologies. In some cases, processing of data generated within the IoT system may be handled by building a distributed computing system using devices (e.g., 105a-c) within the IoT system (e.g., those devices with sufficient computing power to participate), and jobs may be defined that correspond to such processing.

As shown in the example of FIG. 1, user devices (e.g., 130a-c), IoT devices (e.g., 105a-c), and other computing devices may be utilized within example distributed computing environments. For instance, computing devices may include examples such as a mobile personal computing device, such as a smart phone or tablet device, a wearable computing device (e.g., a smart watch, smart garment, smart glasses, smart helmet, headset, etc.), purpose-built devices and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

One or more networks (e.g., 140) can facilitate communication between computing devices (e.g., 105a-cm 130a-c, 135a-c, etc.), job management system 120, job analytics system 125, gateways (e.g., for an IoT system), and other systems utilized to implement, manage, and support distributed computing systems. Such networks can include wired and/or wireless local networks, public networks, wide area networks, broadband cellular networks, the Internet, and the like.

In general, "servers," "clients," "computing devices," "network elements," "hosts," "system-type system entities," "user devices," "gateways," "IoT devices," "sensor devices," "servers," and "systems" (e.g., 105a-c, 120, 125, 130a-c, 135a-c, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like. These same networks of devices may be leveraged to implement example distributed computing systems.

Figure 1B:
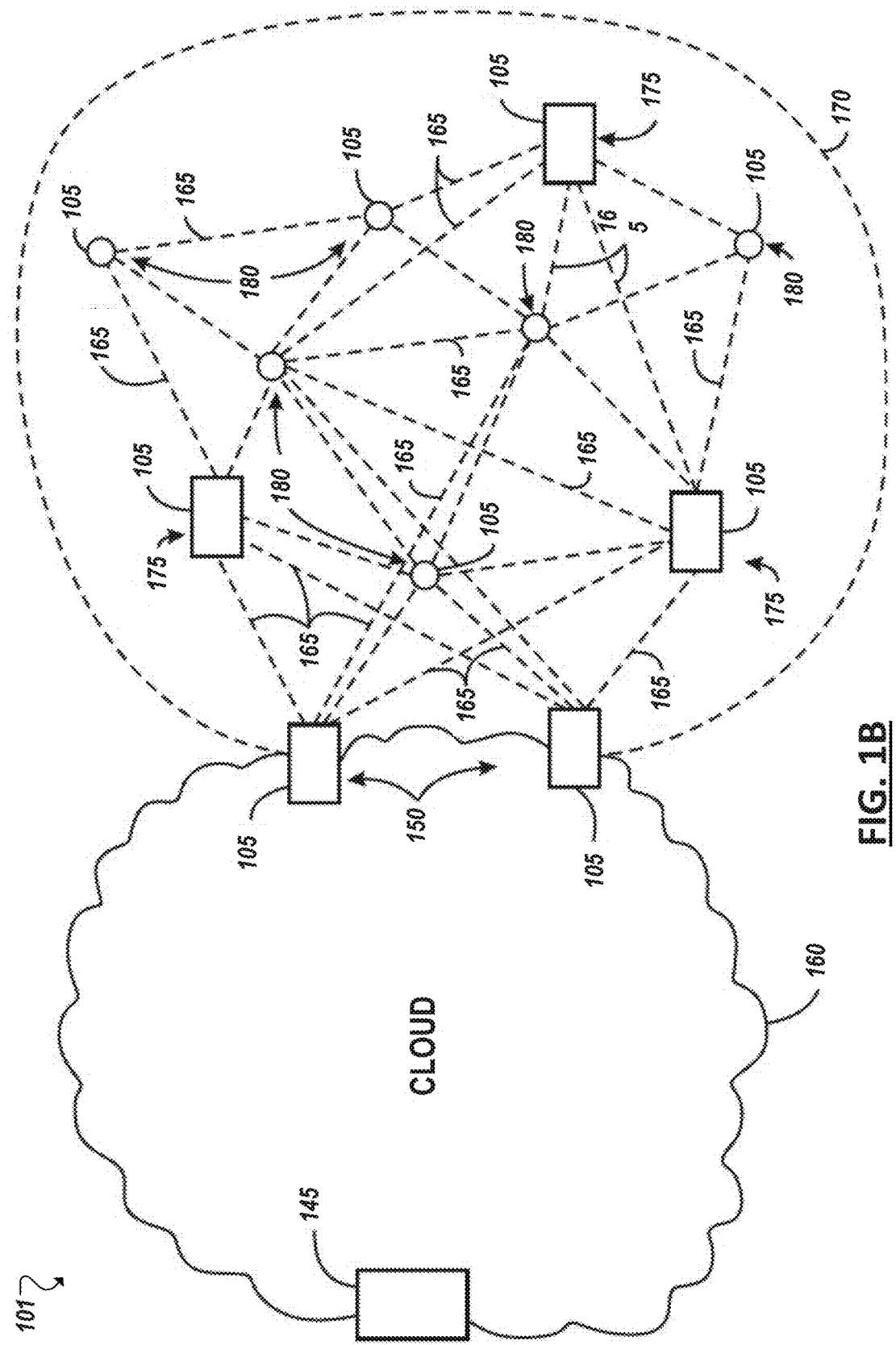
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105a-d), which may be termed a "fog," may be operating at the edge of the cloud. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 105 are shown in this example, gateways 150, data aggregators 175, and sensors 180, although any combinations of IoT devices 105 and functionality may be used. The gateways 150 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 150. As described herein, the sensors 180 may provide power, location services, or both to other devices or items.

Communications from any IoT device 105 may be passed along the most convenient path between any of the IoT devices 105 to reach the gateways 150. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 may be configured in a declarative programming style, allowing the IoT devices 105 to reconfigure their operations and determine needed resources in response to conditions, queries, and device failures. Corresponding service logic may be provided to dictate how devices may be configured to generate ad hoc assemblies of devices, including assemblies of devices which function logically as a single device, among other examples. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

In cloud computing and high performance computing, a large job may be divided into many small tasks for parallel execution in a distributed computing environment. While achieving maximum parallelism through homogeneous task execution time in a job (or for a stage of a job if the job is composed of different heterogeneous stages) may be desirable, in real systems this can be difficult to achieve. For instance, such maximum parallelism may not be achievable for a variety of reasons, such as hardware differences between devices in the distributed computing system, prioritized dynamic allocation of constrained resources to tasks running concurrently on the same device, uneven partition of workloads, data locality, among other examples. In cases where parallelism is not achieved, some tasks within the job may manifest as "straggler" tasks (also referred to herein simply as "stragglers") that are completed considerably slower than the remaining tasks in the job, thereby delaying the completion of the job (or the stage of the job). The identification and diagnosis of straggler tasks may be an important component in assessing the performance of a distributed computing system and identifying opportunities to improve job completion performance, among other example benefits.

Tradition data analytics tools have utilized a wide range of tools and application programming interfaces (APIs) to collect performance data within computing systems. Tools may be used, which implement scalable displays of performance data, interactive visualization of performance data, among other example. Such tools may be provided to analyze performance data sets that are too large and too complex for raw consumption. However, such tools may still rely on significant manual human analysis, which is labor intensive, error-prone, and inefficient. In one instance, an example job analytics system is provided with functionality to automatically identify and diagnose conditions underlying slow tasks within jobs handled by a distributed computing system. For instance, the job analytics system may combine unsupervised learning and supervised learning to perform diagnoses of straggler tasks within a job.

In one example, an example job analytics system may first identify straggler tasks in a job using an unsupervised clustering technique. The unsupervised clustering technique may be employed to group the tasks of a job (or a job stage) into clusters based on their execution time. One or more clusters may be identified corresponding to slow tasks, with these clusters of tasks labeled as stragglers. Thereafter, a supervised rule learning technique may be used which takes the task straggler labels, additional task performance attributes, and the tasks' respective resource assignments as input. The supervised rule learning technique may thereby learn simple and easy-to-read rules to represent diagnosis results for the job and infer straggler tasks (e.g., "if a task's assigned memory is less than $\gamma$, then the task will be slow", etc.). Through the generation of simple and easy-to-read rules, post-analysis adjustment or even online resource allocation and scheduling may follow to improve job completion performance.

Figure 2:
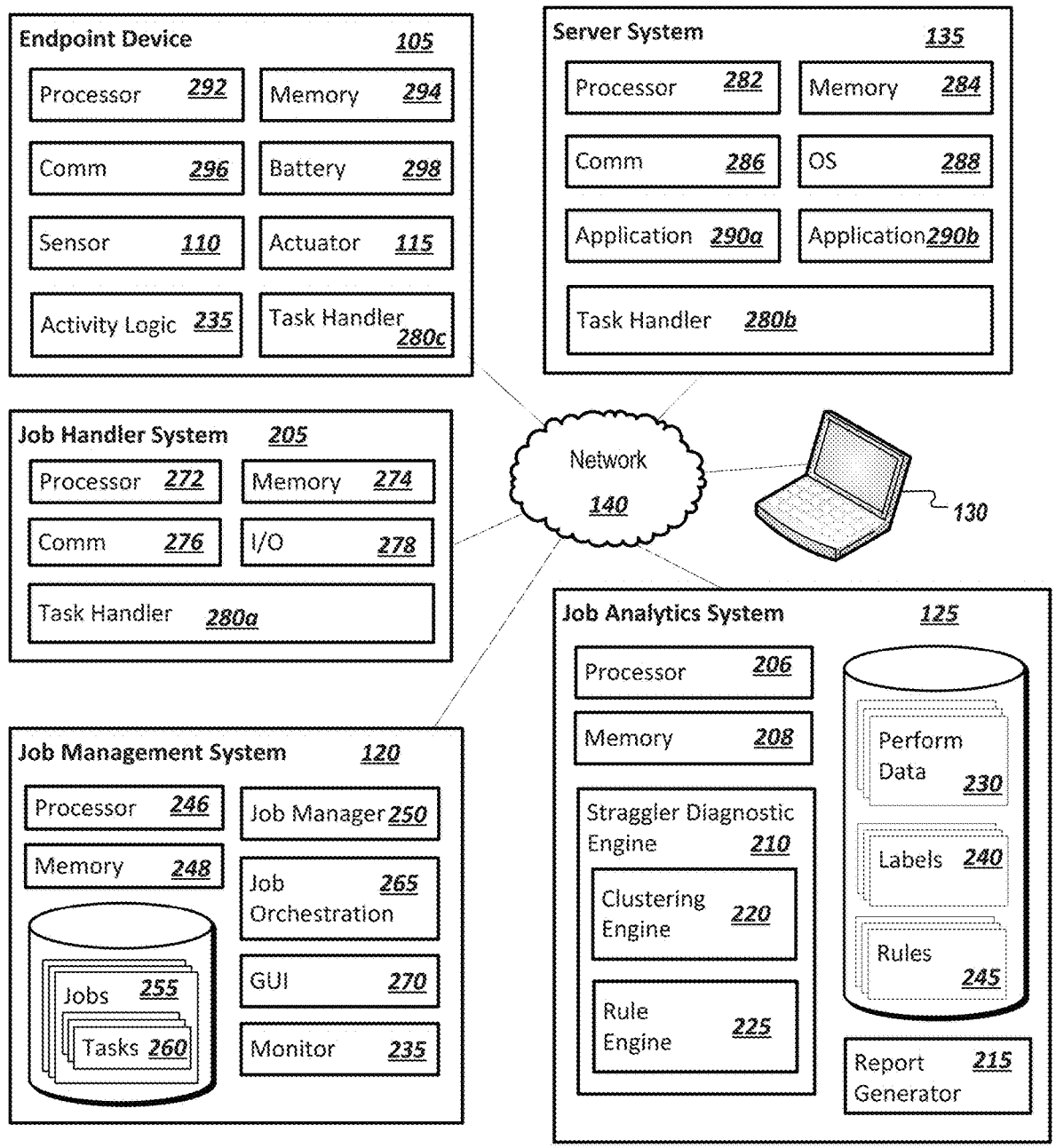
FIG. 2 illustrates an embodiment of a system including an example job analytics system and job management system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple computing devices (e.g., 105, 135, 205, etc.), which may be used together to perform a distributed computing job. In this example, an example job management system 120 and job analytics system 125 may additionally be provided to orchestrate and monitor performance of the distributed computing job, as well as perform analytics on performance data generated during the monitoring or assist in the identification of optimizations that may be carried out in future distributed computing jobs (including future instances of the same job). Such analytics may include machine-learning-implemented analytics to identify and diagnose straggler tasks within distributed computing jobs, for instance, using a straggler diagnostic engine 210 of job analytics system 125, among other example implementations.

In some implementations, job analytics system 125 may include one or more data processing apparatus (or "processors") (e.g., 206), one or more memory elements (e.g., 208), and components implemented using code executed by the processors 206 and/or hardware-implemented circuitry and logic, such as a straggler diagnostic engine 210, other engines (not shown) to provide additional data analytics functionality, report generator 215, among other examples. In one example, a straggler diagnostic engine 210 may include components such as a clustering engine 220 and rule engine 225. In one example, the clustering engine 220 may be implemented as an unsupervised machine learning algorithm to cluster tasks within a given job based on the respective execution times reported (e.g., by a job monitor utility 235) in execution record data 230 generated from the monitoring of the tasks. For instance, a clustering algorithm may be employed, taking reporting execution times of job tasks as the input. For instance, a k-means clustering algorithm may be employed in some implementations of a clustering engine 210. Through such machine learning techniques (including those discussed in examples below), the clustering engine 210 may generate clusters and identify at least a portion of the clusters (e.g., a cluster having tasks with the longest execution times) as straggler tasks. Such an identification can serve as labels 240 for the execution data (and the corresponding tasks), with some tasks being labeled as stragglers, others as non-stragglers, or other categories (e.g., based on finer levels of granularity and representing tasks as falling somewhere between stragglers and non-stragglers), among other example features. Corresponding label data 240 may be generated in connection with the categorizing of tasks (on basis of observed execution time) by the clustering engine 220.

An example straggler diagnostic engine 210 may be further include a rule engine 225, which may utilize the labels 240 generated by the clustering engine 220 to perform further machine learning tasks on the execution records detailing the performance of tasks in a particular distribute computing job. The rule engine 225, in one example, may perform supervised machine learning techniques to identify conditions and parameters that indicate or have positive correlations with straggler tasks in a particular job. For instance, using the labels (identifying which tasks were stragglers and which were not), the machine learning logic of the rule engine 225 may take, as inputs, execution record 230 data corresponding to each of the tasks (straggler and non-straggler) and describing detailed performance characteristics of each of the tasks. Such performance characteristics may include performance counter information such as the actual amount of processing, memory, I/O, networking, and other computing resources utilized by each task within the performance of the job. The performance characteristics may further include resource assignment characteristics, such as an identification of the computing resources that the host device (performing the task) allocated or assigned to the task (which may be different from what the task actually utilized to complete) or particular attributes of the specific host device utilized to complete the task, among other examples. These various performance characteristics may serve as the features within the learning algorithm, and rules or observations may be generated from the machine learning analysis to identify the various combinations of performance characteristics that appear to result in straggler (and/or non-straggler) tasks within a given job. In one example implementation, a decision stump induction supervised machine learning algorithm (such as discussed in one or more examples below) may be employed by an example rule engine 225 to generate rule data 245 describing the findings of the rule engine's results. In this sense, "rules" may refer to predicted conditions or rules that will or are likely to result in straggler tasks in certain jobs, although these "rules" may instead offer only guidelines or observances of the tendencies and correlations determined from execution of the straggler-task-based supervised machine learning algorithm of the rule engine 225, among other examples.

Rules data 245 generated by the rule engine 225 may be utilized, in some implementations, by a report generator 215 of an example job analytics system 125 to generate report data from the rules data 245 (and other results of the clustering and rules engines 220, 225, in some examples) that may be consumed by human users and/or other computing systems (e.g., job management system 120) to assist in mitigating against straggler jobs and making the performance distributed computing jobs more efficient and optimized. In one example, a report generator 215 may generate report data, which may be configured for presentation in a graphical user interface of a user device (e.g., 130) to describe to a user administrator (e.g., of a distributed computing environment) the execution time performance of tasks in a recently completed job (or multiple jobs), along with a description of the observed reasons why some of the tasks may have manifested as stragglers within the job(s). The user may then use this information to manually assess ways in which future jobs may be better deployed. In some cases, the user may obtain insights from the report data, which the user may not only apply in future instances of these same jobs, but in other different distributed computing jobs, among other example uses and benefits. Further, the user may use this information to tune characteristics and settings applied (e.g., at least in part by the user) at a job management system 120 utilized to orchestrate the distribution of tasks in jobs within a distributed computing system. In still other examples, report data 215 may be configured to be machine-readable or -parsable, with some rules and conditions (e.g., identified from rule data 245) capable of being automatically identified and applied by the job management system 120 in subsequent jobs deployed using the job management system 120. In some implementations, straggler tasks analysis performed by a straggler diagnostic engine for a particular job may be utilized with straggler task analysis performed for other jobs or other analytics results of jobs performed using job analytics system 125 to derive data describing still further insights. For instance, further layers of machine learning may be employed to identify broader trends and rules affecting a distributed computing system composed by a certain combination of devices to determine job-specific opportunities to optimize task definitions and assignments for optimal performance, among other example uses.

A distributed computing system may further utilize or rely upon a job management system 120 to assist in defining and assigning tasks within various jobs to the various devices and systems (e.g., 105, 135, 205) implementation the distributed computing system. In one example, a job management system 120 may include one or more processors (e.g., 246), one or more memory elements (e.g., 248), and a variety of components implemented in software and/or hardware to perform management tasks within the distributed computing system (or potentially multiple different distributed computing systems, with the job management system 120 being offered as a service). For instance, an example job management system 120 may include a job manager 250, a job orchestration engine 265, a performance monitor (e.g., 235), a graphical user interface (e.g., 270), among other examples.

In one example, the job manager 250 of an example job management system 120 may be provided with logic to manage a collection of jobs 255 that may be deployed for completion in a distributed computing environment managed by the job management system 120. Each of the jobs 255 may be composed of a respective set of tasks 260. In some implementations, job manager 250 may be utilized to assist in defining or identifying this set of tasks 260. The job manager 250, in some implementations, may additional include functionality for identifying various requirements, dependencies, or other features of the jobs and their tasks, to assist in determining how to distribute tasks within a distributed computing environment, among other example features.

An example job management system 120 may further include job orchestration logic 265, which may be utilized to determine a number of computing devices within a distributed computing environment and determining how to distribute the various tasks of a job to these computing devices (and whether some of these computing devices should be excluded (e.g., based on a lack of capacity, sufficient security or permissions, required computing resources, etc.)). The job orchestration engine 265 may further identify data that is to be operated upon within the job 255 (in one or more of the composite tasks 260), and may orchestrate the delivery or access of such data to make the data available to the device(s) performing tasks that may use this data. Further, in some instances, some tasks may be dependent on others, such that job orchestration logic 265 may further orchestrate the ordering of the performance of these tasks, orchestrate communication between different devices hosting dependent tasks, and/or consolidating assignment of certain dependent tasks with a common host device where possible, among other tasks. The job management system 120 may also be used to address the amount of computing resources that is dedicated (or advertised as needed) for a given task, and may provide such information in connection with the assignment of tasks to various devices in a distributed computing environment. In some implementations, a graphical user interface (GUI) 270 may be provided in connection with a job management system 120 allowing a user to provide direction to job orchestration logic 265 and affect at least some settings and implementations of distributed computing jobs within a given system.

In the example of FIG. 2, an example job management system 120 is shown to include a job performance monitor 235, which may be used to monitor the performance of a given job by a distributed computing system. In some instances, the monitor utility 235 may collect and aggregate data from multiple monitors (e.g., resident on the devices performing the job tasks) and may generate performance data 230 that describes attributes of the performance of the job, as well as its composite tasks. In some cases, the monitor 235 may generate performance data formatted, standardized, or otherwise adapted for use by a corresponding job analytics system, among other examples.

As noted above, a distributed computing environment can include a variety of devices, including heterogeneous devices. In a first example, a job handler system (e.g., 205) may be provided that is provided for the sole purpose of being used as a node in a distributed computing environment. A job handler system 205, in one example, may be a general purpose computing device provided with various computing resources to enable the device to flexibly perform a variety of different tasks in a variety of different jobs. In one example, computing resources of the job handler system 205 may include one or more processors (e.g., 272), one or more memory elements (e.g., 274), network communication module(s) 276, input/output (I/O) or other bus or interconnect resources (e.g., 278), among other examples. In one instance, a job handler system 205 may be provided with task handler logic (e.g., 280*a*), to provide an interface to accept task assignments (e.g., as made by a job management system 120 and potentially delegated from other systems) and determine the mechanisms (e.g., resource assignments) to be used to complete the task, among other features and functionality allowing the system 205 to participate in an example distributed computing system and handle tasks within jobs performed using the distributed computing system. Other devices (e.g., 105, 135) may include the same or similar logic (e.g., 280*b-c*) to allow their participation in distributed computing systems as well.

The computing resources of other devices (e.g., 105, 135) may likewise may be utilized in distributed computing devices, even when these other devices have competing demands on their resources. For instance, an example server system (e.g., 135) may be provided, which is primarily used to host one or more applications and services (e.g., 290*a-b*) (and corresponding data), but which may nonetheless retain excess computing capacity to allow the server system to be at least occasionally used in a distributed computing job. For instance, an example server system 135 may include one or more processors (e.g., 282), one or more computer memory elements (e.g., 284), communications and networking resources (e.g., 286), operating system resources (e.g., 288), among other example resources, which may be required or otherwise be of value in the performance of one or more tasks in a distributed computing job.

As another example, endpoint devices (e.g., 105), such as sensor devices or other special purpose or smart devices, may likewise possess available computing resources which may be tapped for use in performing a distributed computing job, despite the endpoint device's 105 other primary responsibilities or functionality. For instance, in the example of FIG. 2, a device (e.g., 105) may include one or more data processing apparatus (e.g., 292), one or more memory elements (e.g., 294), one or more communications modules (e.g., 296), a battery (e.g., 298) or other power source (e.g., a solar cell, AC connection and adapter, etc.), among other components. Each device (e.g., 105) can possess hardware, sensors (e.g., 110), actuators (e.g., 115), and other logic (e.g., 235) to realize the intended function(s) of the device (including operation of the respective sensors and actuators). In some cases, devices may be provided with such assets as one or more sensors (e.g., 110) of the same or varying types, actuators (e.g., 115) of varying types, computing assets (e.g., through a respective processor and/or software logic), security features, data storage assets, and other resources. Communication modules (e.g., 296) may also be utilized as communication assets within some deployments and may include hardware and software to facilitate the device's communication over one or more networks (e.g., 140), utilizing one or more technologies (e.g., WiFi, Bluetooth, Near Field Communications, Zigbee, Ethernet, etc.), with other systems and devices. While these resources may be primarily provided to allow the endpoint device 105 to perform its particular purpose or to participate in a machine-to-machine (M2M), IoT, or other system, these resources, when available, may also be partially utilized to implement a distributed computing system capable of performing a variety of different jobs, with some of these jobs' tasks being assigned to such endpoint devices (e.g., 105), among other examples.

Figure 3:
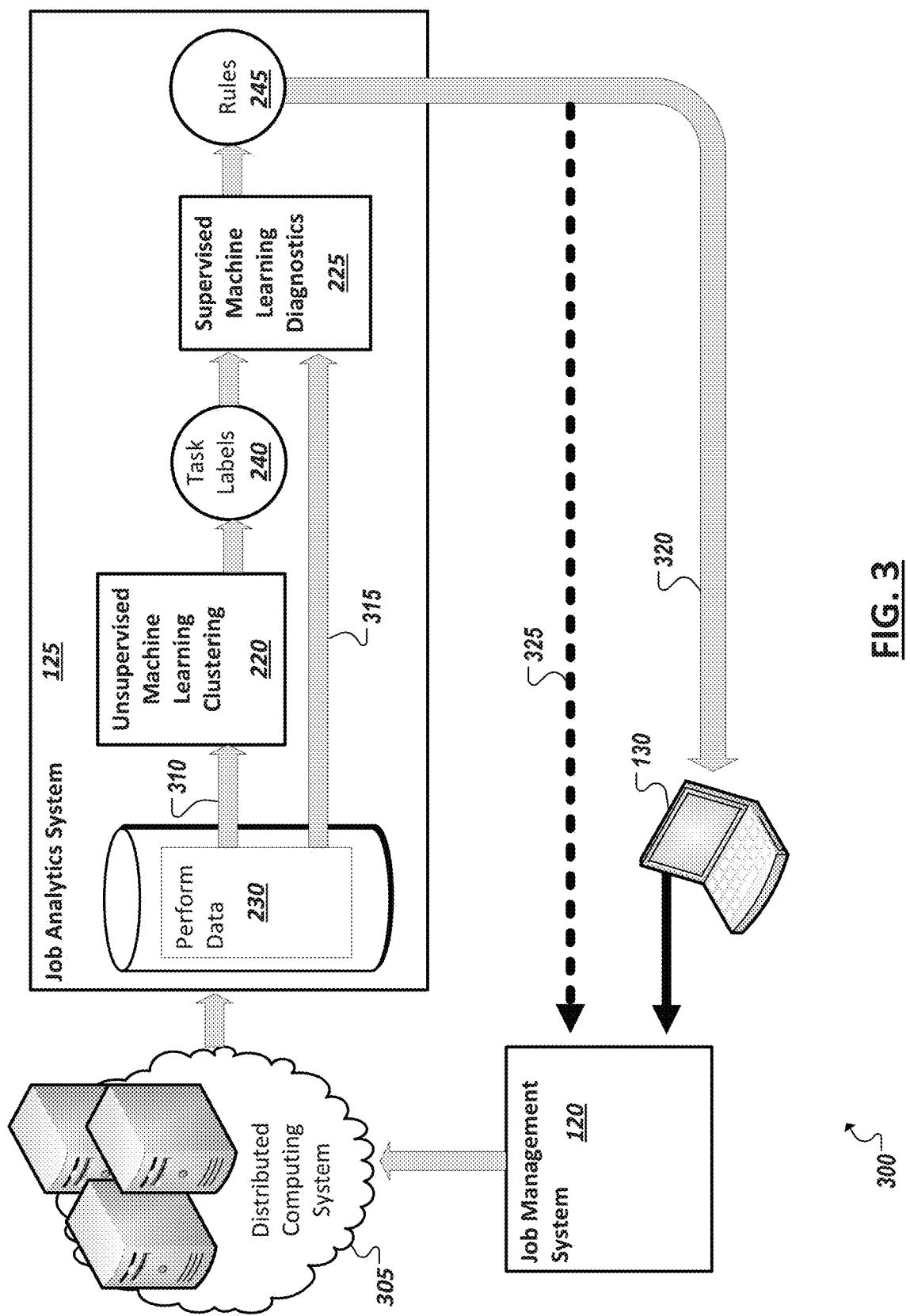
FIG. 3 is a simplified block diagram illustrating a flow involving an example job analytics system.

Turning to the example of FIG. 3, a simplified block diagram 300 is shown illustrating the use of an example job analytics system 125 equipped with logic to perform analytics to identify and diagnose straggler tasks within distributed computing jobs. For instance, performance data 230 may be generated to describe the performance of the individual tasks of a particular distributed computing job completed by a distributed computing system 305 composed of multiple different computing devices. The performance data 230 may be collected from one or more monitoring tools monitoring performance of the job tasks by the various host devices in the system 305. The performance data 230 can describe performance attributes for each of the tasks, including the time taken to complete execution of the task (or execution time), performance counter data (e.g., generated by performance counters of the host system) describing an array of performance attributes for each task, resource assignment attributes describing how resources of the respective host device were assigned for performance of the corresponding task, among other potential examples.

In the example of FIG. 3, execution time information for each task in a particular job may be provided, from the performance data (e.g., as execution time data 310), to a module 220 implementing an unsupervised machine learning clustering algorithm, such as a k-means clustering algorithm, Gaussian mixture model with expectation-maximization algorithm, or another clustering algorithm. The clustering algorithm may be used to cluster the job tasks by execution time, with one or more clusters identified as corresponding to straggler tasks within the job. The module 220 may generate a set of labels 240 based on these clusters, the set of labels 240 including a label for each of the tasks indicating the degree to which the task was a straggler within the job or not. In some cases, the labeling can be binary, with each task being labeled as a straggler or not a straggler. In other cases, non-binary labeling can be defined and applied, with the labels providing a more fine-grained indication of a corresponding task's execution time diverging from the execution time of other tasks in the job, among other examples.

Continuing with the example of FIG. 3, a supervised machine learning diagnostics algorithm may be provided through another module 225 of the job analytics system 125, that may take the labeling defined in the tasks labels 240 generated from the unsupervised machine learning clustering (at 220) along with inputs describing additional task performance attributes defined in the performance data 230. For instance, performance attributes such as would be collected by system performance counters and attributes describing the resource assignments made for each task, may be documented in performance 230, and data (e.g., 315) identifying these additional attributes (for each of the tasks of the job, regardless of the label determined by module 220) maybe provided to module 225 for assessment. In one example, a supervised machine learning technique, such as decision stump induction algorithm, a C4.5 algorithm for decision tree or decision list learning, classification and regression tree (CART), or another algorithm may determine those combinations of attributes (from data 315) that correspond to or indicate tasks whose execution times will cause them to manifest as straggler tasks or non-straggler tasks. Such combinations of attributes (and there may be multiple identified combinations of features) may be determined using the supervised machine learning step performed by module 225 and form the basis of rule data 245 generated at the job analytics system 125 to indicate these attributes (e.g., in some cases in the form of a rule or condition based on the attributes identified as corresponding to stragglers and non-straggler tasks.

Continuing with the example of FIG. 3, in some implementations, results in rule data 245 may be packaged for presentation or use by other systems. For instance, a report may be generated and provided (at 320) that is based on the results in rule data 245. The rule data (and corresponding report) may be generated to present human-readable summaries of the findings (e.g., straggler-related rules, conditions, correlations, etc.) to a user (e.g., at a corresponding user device (e.g., 130)). The user may determine adjustments that may be made in future instances of a distributed computing job (or distributed computing jobs generally) based on the feedback embodied in the information of rule data 245. The user may utilize these insights to make these adjustment to such future distributed computing jobs (e.g., by interfacing with a corresponding job management system 120, among other example. Further, in some instances, rule data 245 may be generated, at least a portion of which (e.g., 325) may be packaged for consumption by a job management system directly. For instance, rule data 245 corresponding to a particular job may indicate that certain resource assignments levels are generally insufficient for certain tasks or certain types of tasks, and this information may be provided 245 (in machine-readable format) to the job management system 120. In some cases, the job management system 120 may automate adjustments to the performance of similar tasks in distributed computing jobs based on the rule data 245. In other cases, the job management system 120 may merely provide guidance to a user administering an example distributed computing system by generating and providing suggestions for the performance of a particular distributed computing job based rule data 245, among other examples.

As introduced above, computing frameworks may divide jobs into a number of small tasks for distributed and parallel computing. Completion status of the composite tasks may be monitored and backup tasks may be launched for straggler tasks during job execution. Traditional distributed computing systems, however, typically do not provide post-execution analysis and do not help diagnose the stragglers to prevent them from happening in future runs of the same job or similar jobs. Further, when backup tasks are launched for stragglers, the job performance is necessarily impacted. In examples, such as that described in FIG. 3 above, post-execution analysis with an automated approach may be provided together with the generation of diagnosis results, which job owners may later leverage to prevent similar straggler task issues in the future.

Example job analytics systems may utilize a two-phase approach, such as in the examples above, to identify and diagnose stragglers in cloud computing and high performance computing using machine learning methods. For instance, as shown in the simplified block diagram 400 of FIG. 4, in a first phase, the stragglers 415 among the tasks 405 in a job (or in a stage of a job) may be identified using unsupervised clustering 410 that combines k-mean clustering with Bayesian information criterion (BIC) for cluster number selection. In the second phase, supervised rule learning 425 may be employed, such as a customized decision stump induction algorithm, to generate a set of simple and easy-to-read rules for straggler inference.

Figure 4:
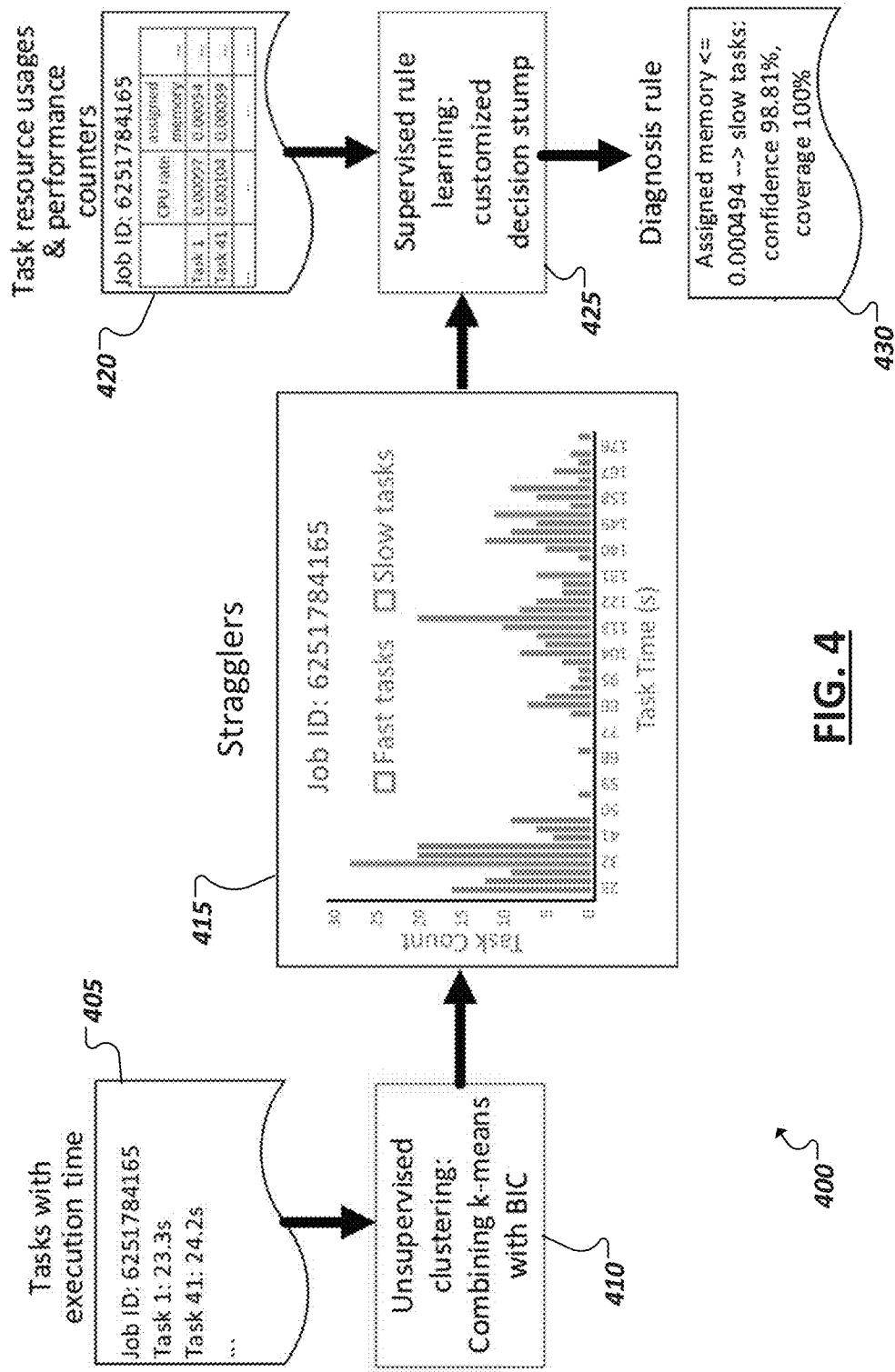
FIG. 4 is a simplified block diagram illustrating use of an example job analytics system.

Exploring the example of FIG. 4 in more detail, in the first phase of straggler identification, the execution time for all the tasks in a job (or in a stage of a job) may be provided as the input to a k-means clustering algorithm to identify a subset of the tasks as the stragglers. For instance, an input may be provided corresponding to the n tasks in a job with execution times $t^{(1)}, \ldots, t^{(n)}$. Further, for $k=1, \ldots, k_{max}$, and tasks $i=1, \ldots, n$, cluster membership is randomly assigned according to $m(i) \in \{1, \ldots, k\}$. The algorithm may then be iterated until a convergence is realized (e.g., with no cluster membership reassignment).

In one implementation, a first step of the k-mean clustering algorithm may begin by calculating the centroids of the clusters with the current members according to:

$$\bar{t}_j = \frac{\sum_{i:m(i)=j} t^{(i)}}{\sum_{i:m(i)=j} 1}, j=1,\ldots,k$$

Tasks' cluster membership may be reassigned according to:

$$m(i) = \mathrm{argmin}_j |t^{(i)} - \bar{t}_j|, i=1,\ldots,n$$

Further, the probability of each cluster, the standard deviation of each cluster, and then Bayesian information criterion (BIC) of the clustering result may be calculated according to:

$$p_j = \frac{\sum_{i:m(i)=j} 1}{n}, \sigma_j = \sqrt{\frac{\sum_{i:m(i)=j}(t^{(i)} - \bar{t}_j)^2}{\sum_{i:m(i)=j} 1}}, j=1,\ldots,k$$

$$BIC(k) = -2\sum_{i=1}^{n} \log\left[p_{m(i)} \frac{1}{\sqrt{2\pi}\,\sigma_{m(i)}} e^{-\frac{(t^{(i)} - \bar{t}_{m(i)})^2}{(2\sigma^2_{m(i)})}}\right] + 2k\log n$$

The clustering result with the best k minimizing BIC according to:

$$k^* = \mathrm{argmin}_k BIC(k)$$

may then be determined and used. In the clustering result, if $$\frac{\bar{t}_{k^*-1}}{\bar{t}_{k^*}} \leq 90\%$$

and $\Sigma_{i:m(i)=k^*} 1 \leq 60\% \cdot n$, labels may be created, which label the tasks in the slowest cluster as the stragglers. Otherwise null is output indicating no straggler identified in the set of tasks.

As introduced in the example and formulas above, an implementation of the clustering module utilized to identify straggler tasks within a given job may utilize an algorithm combining k-means homogeneous clustering with Bayesian information criterion for cluster number selection. Various cluster numbers may be tried. In each try, the standard k-means clustering may be run, which iterates between the step of estimating the cluster centroids using the current cluster membership and the step of reassigning tasks into the clusters based on their proximities with the centroids. This example algorithm converges when no cluster membership reassignment happens in the iteration. At this point, the Bayesian information criterion (BIC) may be calculated for the specific cluster number k. The first term in BIC, $$-2\sum_{i=1}^{n} \log\left[p_{m(i)} \frac{1}{\sqrt{2\pi}\,\sigma_{m(i)}} e^{-\frac{(t^{(i)} - \bar{t}_{m(i)})^2}{(2\sigma^2_{m(i)})}}\right], \quad (1)$$

describes the negative log likelihood of generating all the task execution time data from the clustering model (e.g., the lower the value, the more probable the data is), assuming task time values in each of the clusters follow a normal distribution. The second term, $$2k\log n, \quad (2)$$

describes the complexity of the model measured approximately with its prior probability, in which the value of 2k is the total number of parameters involved in describing the k normal distributions (as for each distribution we have one parameter for its mean and another for its standard deviation). The best cluster number may be selected, which minimizes the joint objective of the negative log likelihood of generating the data with the model and the model complexity. In the corresponding clustering results, the two slowest clusters may be checked. In one example, if the task number of the slowest cluster does not exceed a predefined threshold and its mean execution time is much longer than that of the second slowest cluster, each of the tasks grouped in this cluster may be labeled as the stragglers tasks within the distributed computing job. The heuristics incorporated in one implementation of the algorithm may prevent either labeling most of the tasks in a job as stragglers when only a small portion of the tasks are fast, or labeling tasks which are just a little bit slower.

Upon determining label for the tasks indicating whether they have been identified as straggler tasks or not, a second machine learning phase may be applied where the straggler labels (that is, the output from straggler identification), the resource assignment, and the performance counters of the tasks are adopted as the input. The diagnosis result may be a rule to infer stragglers based on their resource assignment and performance counters. These rules may be embodied as simple and human- (and/or machine-)readable rules, whereby interesting and valuable insights may be discovered explaining why the tasks identified as stragglers are slow. This may assist the job owner to understand the probable causes and perform post-analysis adjustments (using a job management system) to improve the job completion performance.

In one example, diagnosis rules may be provided through the decision stump classifiers returned from supervised straggler diagnosis algorithm. As a special case of decision tree containing only one level, a decision stump may take a single condition test on the input attributes of a task and determines whether the task is a straggler or not based on the test result. Decision stumps can be re-written into simple rules. For instance, when the condition test applies to only one attribute (e.g., an "atomic condition"), a rule may be generated based on this attributes, such as: "If its assigned memory is no greater than γ, then the task is a straggler. (Otherwise it is not a straggler.)," among other potential examples. In some implementations, a decision stump algorithm may be further extended to combine two atomic conditions with an "and" or "or" operator. For instance, when a condition test becomes a 2-atomic-condition combo, a rule may be generated such as: "If its CPU rate is no greater than η and its canonical memory usage is greater than λ, then the task is a straggler. (Otherwise it is not a straggler.)," among other examples.

In some implementations, a customized decision stump induction algorithm may be utilized to determine rules associated with straggler tasks sets. For instance, performance attributes may be assembled for each task, to form a feature vector $x^{(i)} = (x_1^{(i)}, \ldots, x_d^{(i)})$. A straggler label $y^{(i)} \in \{1, -1\}$ may also be assigned to the task based on the k-means clustering algorithm results, with the straggler label serving as the class label to be predicted by the classifier. Walking through all the attributes, all the atomic conditions may enumerated. The atomic conditions can then be combined to generate all the 2-atomic-condition combinations for each task. The atomic conditions and the 2-atomic-condition combinations may, in one example, form the entire search space. The search space may then be searched, such that, for any condition c being searched, the utility of the condition may be rated on the training set as follows, in one example. A rule may be built using the condition and may then be applied to the training set to predict whether a task is a straggler or not. The rule's confidence can be calculated (that is, its empirical precision p(c)), which is the number of true positives versus the number of both true positives and false positives. Confidence measures the likelihood that a straggler identified by the rule is a true straggler on the training set. The rule's coverage may then be calculated (that is, its empirical recall r(c)), which may represent the number of true positives versus the number of both true positives and false negatives. Coverage may measure the likelihood that a true straggler is identified by the rule on the training set. As a higher coverage usually implies a lower confidence (and vice versa), we combine the two metrics using their harmonic average, the empirical f-measure f(c). In this particular example, the rule with the best empirical f-measure may be selected. If the value exceeds a predefined threshold used for controlling the output quality, then the rule is output as the diagnosis result.

In one example implementation of a customized decision stump induction algorithm, introduced above, resource assignment parameters and performance counter parameters may be provided as an input vector $x^{(i)}=(x_1^{(i)}, \ldots, x_d^{(i)})$, along with straggler labels $y^{(i)} \in \{1, -1\}$ for each of the tasks $i=1, \ldots, n$. For an attribute $j=1, \ldots, d$, all of the atomic conditions $C_j=\{c_{j,1}, \ldots, c_{j,s}\}$ may be enumerated, where each atomic condition $c_{j,q}$ is in the form of either "$x_j > \gamma$" or "$x_j \leq \gamma$", where $\gamma$ is a threshold induced during learning. For an attribute pair $(j,k)$, $j=1, \ldots, d$, $jk=j+1, \ldots, d$, a combination of two atomic conditions may be further enumerated, according to:

$$C_{j,k}=\{c_{j,q} \wedge c_{k,r} | c_{j,q} \in C_j, c_{k,r} \in C_k\} \cup \{c_{j,q} \wedge c_{k,r} | c_{j,q} \in C_j, c_{k,r} \in C_k\}$$

Thereafter, the candidate condition set may be generated with both atomic conditions and two-atomic-condition combinations, according to:

$$C = \bigcup_{j=1,\ldots,d} [C_j \cup_{k=j+1,\ldots,d} C_{j,k}]$$

Continuing with this example, to generate rule labels for the straggler task set, the space C may be searched, where, for a condition $c \in C$, a rule is created "if c, then y=1". For task $i=1, \ldots, n$, the rule and the task features may be used to determine its straggler label $\hat{y}^{(i)}$. The module implementing the modified decision stump algorithm may then calculate confidence (empirical precision) p(c), coverage (empirical recall) r(c), and empirical f-measure f(c) of the rule with c on the same data set, for instance, according to:

$$p(c) = \hat{P}(y^{(i)} = 1 | \hat{y}^{(i)} = 1)$$

$$r(c) = \hat{P}(\hat{y}^{(i)} = 1 | y^{(i)} = 1)$$

$$f(c) = \frac{2p(c)r(c)}{p(c) + r(c)}$$

One or more rules may then be selected using a heuristic search algorithm (e.g., taking a search space and an evaluation function as the input), such as a grid search, hill-climbing, simulated annealing, etc., to maximize the empirical f-measure, according to:

$$c^* = \mathrm{argmax}_{c \in \mathcal{C}} f(c)$$

In this example, if $f(c^*) \geq 0$ (an acceptable threshold, e.g., 70%), then the rule "if $c^*$, then y=1" may be output, otherwise a null may be output indicating a failure to automatically generating diagnosis result, among other examples.

In some implementations of an example decision stump induction algorithm, such as the example implementation discussed above, information gain is not used, which is a common criterion in decision tree induction calculated based on the empirical entropy on the data. This may be done as the data sets on stragglers are expected to demonstrate various extent of imbalanced label distribution. Maximizing information gain may lead to rules determining the non-stragglers with high confidence in an unbalance data set. Further, the best rule may be selected based on its performance on the training set only. In many cases it does not guarantee that the rule will perform well on an unseen set of tasks drawn from the same probability distribution. However, it may be assumed that simple classifiers in such machine learning are more likely to perform similarly on a set of unseen data as they do on the training data. Among other example advantages, the specific customized decision stump induction algorithm discussed above produces simply rules using atomic conditions and two-atomic-condition combinations. Therefore it is expected that the rule is good in explaining the stragglers for different runs of the same job even if they are not seen in the training data, among other example considerations.

To illustrate one example of the use of such a two-step straggler task diagnostic system, jobs managed through a large-scale cluster management system may be assessed. Specifically, the straggler tasks for jobs in the trace may first be identified (e.g., using k-means clustering based on the respective execution times of the job's tasks) and then the stragglers may be diagnosed (e.g., using a decision stump induction algorithm) to obtain the rules for straggler inference. To evaluate the quality of the rules, objective metrics may be used, to predict performance of the rules on held-out sets of tasks within the same jobs. The large-scale cluster management system may run a large number of jobs from many different applications on clusters with tens of thousands of servers and support the features of concurrent execution of jobs, process-level isolation for tasks, and resource allocation based on different factors. In this example system, each job consists of a set of seemingly homogeneous tasks with the same program (binary), the same resource request, and approximately the same start time. The actually resource allocated, however, may depend on the relatively importance of the tasks (compared with other concurrent tasks running on the same machines) and their resource usage history.

Continuing with this example, a representative workload of an example large-scale cluster management system may be a one-month trace of a cluster with more than 10000 servers. For each of the tasks in the trace, its resource usages may be monitored with performance counters and the resource assignment recorded every five minutes. In this example, the values may be scaled relative to the largest capacity of the corresponding resource on any machine in the trace. A straggler clustering analysis may be conducted using k-means clustering. In this example, a percentage of tasks may be identified as straggler tasks. Straggler diagnosis may then be performed using a decision stump induction algorithm. In this example, during straggler diagnosis, the resource assignment and performance counter readings may include examples such as CPU rate, canonical memory usage, assigned memory, unmapped page cache, total page cache, disk I/O time, and local disk space usage to form the attributes in the feature vector of the task for decision stump induction. The automatic straggler diagnosis may then operate on the attributes to determine rules based on the attributes, which indicate conditions in which straggler tasks are likely. For instance, example rules may result such as:

Job ID 6252566391: assigned memory$\leq$0.000499$\rightarrow$stragglers, confidence 98.82%, coverage 99.29%;

Job ID 6252460980: CPU rate$\leq$0.000454 or assigned memory$\leq$0.000396$\rightarrow$stragglers, confidence 94.00%, coverage 87.04%;

Job ID 6251640760: CPU rate$\leq$0.000884 and canonical memory usage$>$0.000785$\rightarrow$stragglers, confidence 90.00%, coverage 87.10%;

among other potential examples.

Some example implementations may include additional or alternative features beyond those described in the examples above. For instance, identification of straggler tasks may be more fine-grained (e.g., non-binary), considering not only the slowest cluster, but several slow clusters as well. In some instances, stragglers identified from fine-grain identification may be easier to diagnose (e.g., the inference rule may have a higher precision and a higher recall in straggler prediction). In some implementations, multiple outlier mechanisms may be supported by an example job analysis system, such that an alternate outlier detection mechanism may be used when other mechanisms identify that stragglers are rare in a particular job. In still other examples, aspects of the job analysis system may be integrated into cloud operating environments, run automatic diagnosis on jobs, present the diagnosis results, and automate feedback generated from the diagnosis into a scheduler for a distributed computing system, closing the loop of job performance improvement, among other example features and enhancements.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 5:
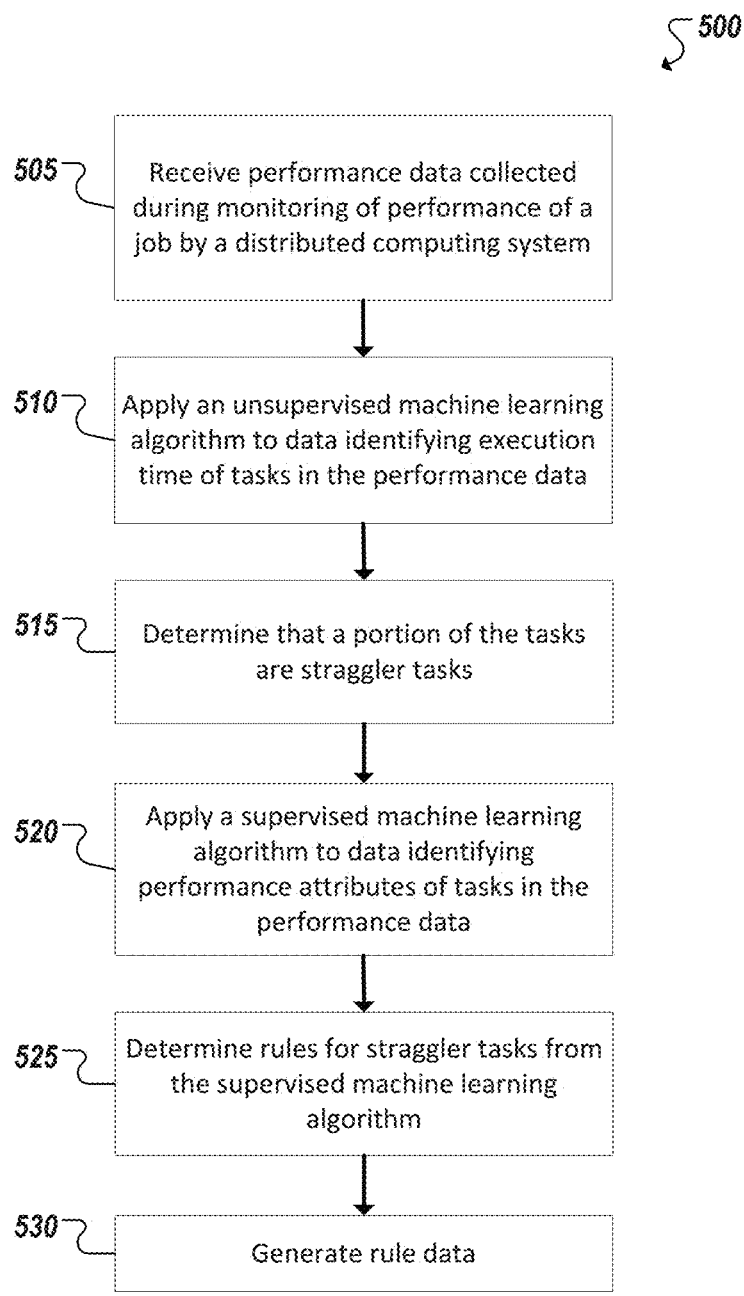
FIG. 5 is a flowchart illustrating an example technique to analyze tasks in a distributed computing system.

FIG. 5 is a simplified flowchart 500 illustrating an example technique for diagnosing straggler events in a distributed computing job. For instance, performance data may be received 505 that has been generated in connection with the monitoring of a job performed by multiple computing devices in a distributed computing environment. The performance data may indicate the execution time of each one of multiple tasks completed in connection with the job. An unsupervised machine learning algorithms, such as a k-mean clustering algorithm, may be applied 510 to the execution times identified in the performance data using machine learning software or hardware of a job analytics system. The unsupervised machine learning algorithm may cluster the individual tasks based on their respective execution times to determine 515 that a portion of the tasks are straggler tasks. The results of the unsupervised machine learning algorithm may be further used to label the tasks based on these clusters, with some of the tasks being labeled as straggler tasks (i.e., tasks with execution times statistically slower than the remaining tasks in the job) and other being labeled as non-stragglers.

Using the designations, or labels, of straggler and non-straggler tasks within a job, as determined using the unsupervised machine learning algorithm (of 510), a supervised machine learning algorithm may be applied 520 to diagnose attributes correlating with straggler tasks. Additional performance attributes of each of the tasks identified in the received (at 505) performance data may be provided as inputs to the supervised machine learning algorithm (such as a customized decision stump induction algorithm) along with the straggler/non-straggler labels derived using the results of the unsupervised machine learning algorithm (of 510) to determine 525 rules for straggler tasks. The rules may identify conditions, measured by the performance attributes, that indicate or predict that a given task within a job is likely to be a straggler task. A set of such rules may be determined 525 and rule data may be generated 530 to describe this set of rules. The rule data 530, in some cases, may be rendered to present a description of the automatically determined rules, in human-readable form, within a user interface. In some implementations, the rule data may be machine-parsable or—consumable, such that a computer-implemented distributed computing job manager may accept the rule data and apply the rules described therein to modify settings and assignments within future distributed computing jobs managed by the job manager, among other examples.

Figure 6:
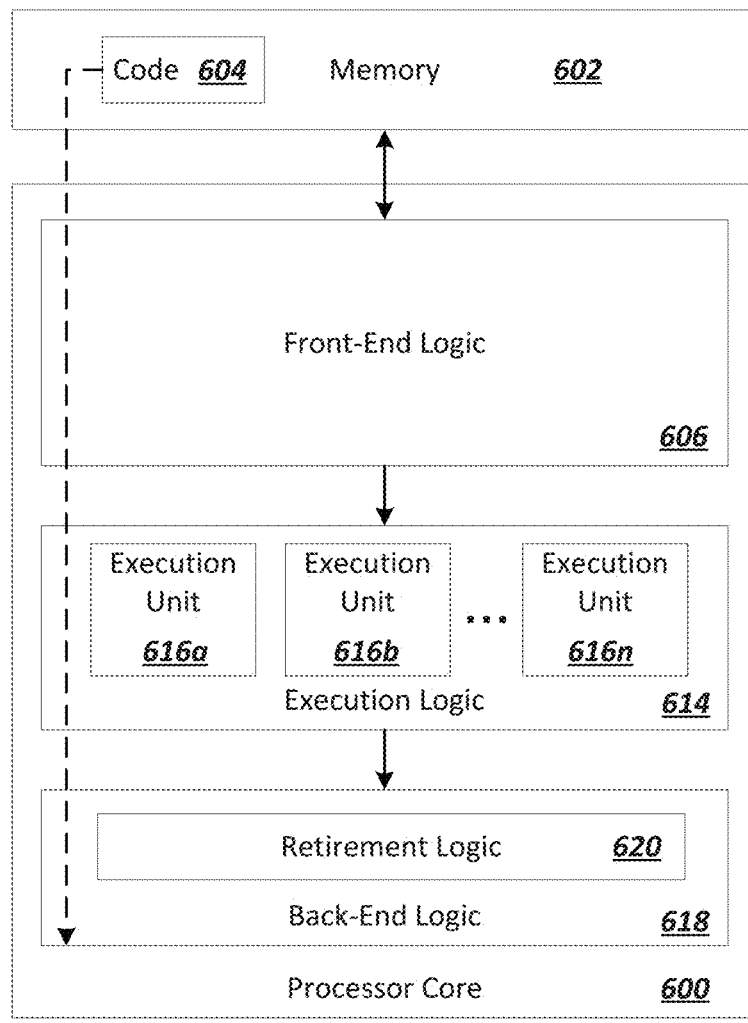
FIG. 6 is a block diagram of an exemplary processor in accordance with one embodiment.
Figure 7:
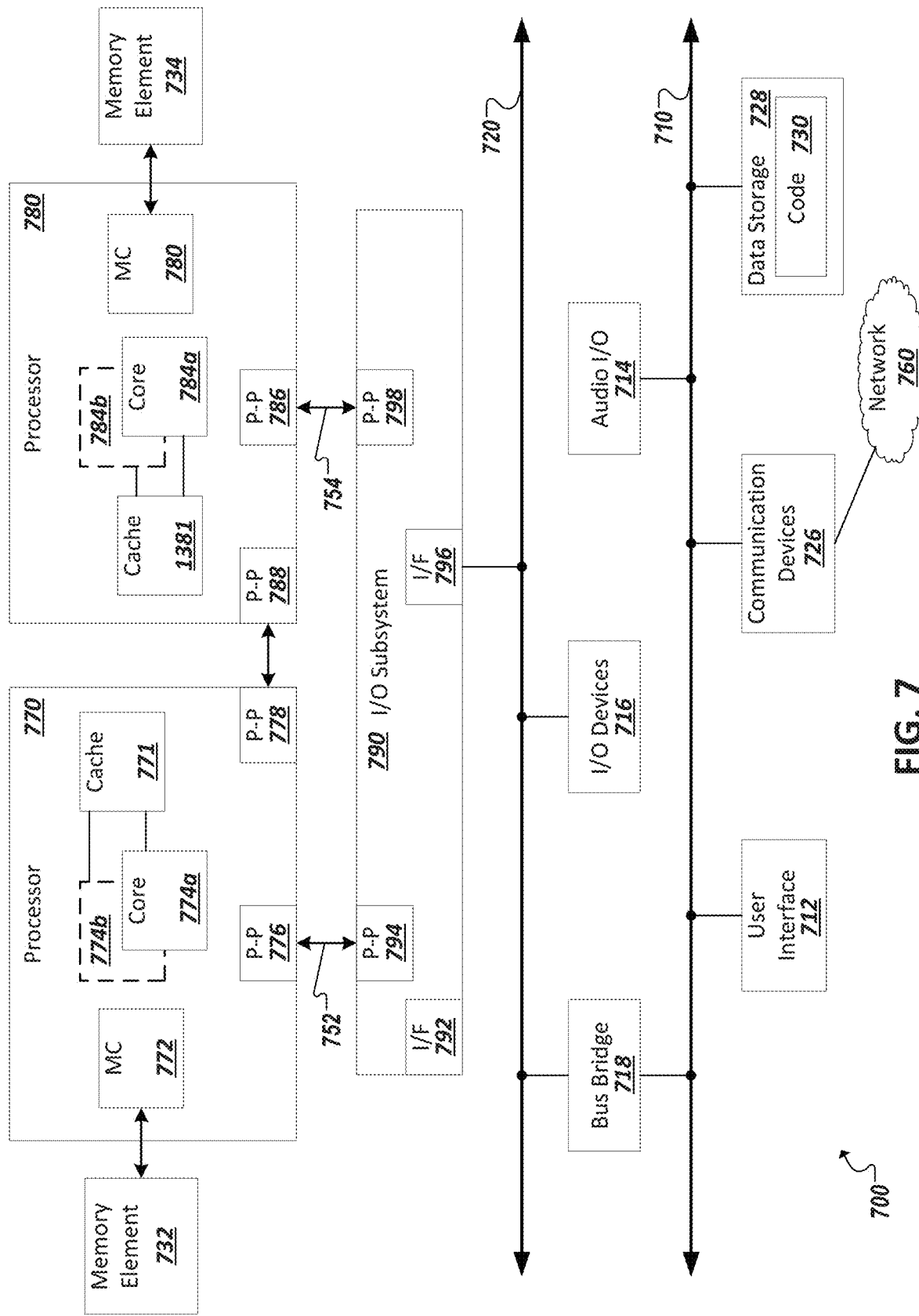
FIG. 7 is a block diagram of an exemplary computing system in accordance with one embodiment.

FIGS. 6-7 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 6-7.

FIG. 6 is an example illustration of a processor according to an embodiment. Processor 600 is an example of a type of hardware device that can be used in connection with the implementations above. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the computing systems described herein may be configured in the same or similar manner as computing system 700.

Processors 770 and 780 may also each include integrated memory controller logic (MC) 772 and 782 to communicate with memory elements 732 and 734. In alternative embodiments, memory controller logic 772 and 782 may be discrete logic separate from processors 770 and 780. Memory elements 732 and/or 734 may store various data to be used by processors 770 and 780 in achieving operations and functionality outlined herein.

Processors 770 and 780 may be any type of processor, such as those discussed in connection with other figures. Processors 770 and 780 may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a user interface 712 (such as a keyboard, mouse, touchscreen, or other input devices), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, where the instructions when executed on a machine, cause the machine to: analyze respective execution times of a plurality of tasks in a job performed in a distributed computing system to determine a subset of the plurality of tasks including a set of straggler tasks in the job, where the distributed computing system includes a plurality of computing devices; perform a supervised machine-learning algorithm using a set of inputs including performance attributes of the plurality of tasks, where the supervised machine learning algorithm uses labels generated from determination of the set of straggler tasks, the performance attributes include respective attributes of the plurality of tasks observed during performance of the job, and applying the supervised learning algorithm results in identification of a set of rules defining conditions, based on the performance attributes of the plurality of tasks, indicative of which tasks will be straggler tasks in a job; and generate rule data to describe the set of rules.

Example 2 may include the subject matter of example 1, where analyzing the execution times of the plurality of tasks to determine the set of straggler tasks includes providing the execution times as inputs to an unsupervised machine learning algorithm.

Example 3 may include the subject matter of example 2, where the unsupervised machine learning algorithm includes a clustering algorithm, results of the clustering algorithm cluster the plurality of tasks into a plurality of clusters based on the respective execution times of the tasks, and the labels correspond to the plurality of clusters.

Example 4 may include the subject matter of example 3, where analyzing the execution times of the plurality of tasks to determine the set of straggler tasks further includes identifying a single one of the plurality of clusters as representing the set of straggler tasks.

Example 5 may include the subject matter of example 3, where analyzing the execution times of the plurality of tasks to determine the set of straggler tasks further includes identifying two or more of the plurality of clusters as representing the set of straggler tasks.

Example 6 may include the subject matter of any one of examples 3-5, where the clustering algorithm includes a k-means clustering algorithm.

Example 7 may include the subject matter of any one of examples 1-6, where the supervised learning algorithm includes a decision stump induction algorithm.

Example 8 may include the subject matter of example 7, where the decision stump induction algorithm includes: determining, from the performance attributes, all atomic conditions for each task; and combining the atomic conditions to generate all two-atomic-condition combinations for each task, where the set of rules are determined from a search space including the atomic conditions and two-atomic-condition combinations.

Example 9 may include the subject matter of any one of examples 1-8, where the performance attributes include performance counter attributes and resource assignment attributes.

Example 10 may include the subject matter of example 9, where the resource assignment attributes identify attributes of a respective computing device in the distributed computing system allocated to the corresponding task.

Example 11 may include the subject matter of any one of examples 9-10, where the performance counter attributes include one or more of central processing unit (CPU) rate, canonical memory usage, assigned memory, unmapped page cache, total page cache, disk I/O time, and local disk space usage.

Example 12 may include the subject matter of any one of examples 1-11, where the rule data includes an automatically-generated, human-readable description of each of the set of rules.

Example 13 may include the subject matter of any one of examples 1-12, where the rule data includes machine parsable code to be processed to direct assignment of tasks in a future performance of a job in a distributed computing system.

Example 14 may include the subject matter of example 13, where the future performance of a job in a distributed computing system includes future performance of the job including the plurality of tasks.

Example 15 may include the subject matter of example 13, where the future performance of the job utilizes a different plurality of computing devices.

Example 16 may include the subject matter of any one of examples 1-15, where a portion of the labels label tasks in the plurality of tasks as straggler tasks and another portion of the labels label other tasks in the plurality of tasks as non-straggler tasks.

Example 17 is a method including: using a computing device to analyze respective execution times of a plurality of tasks in a job performed in a distributed computing system to determine a subset of the plurality of tasks including a set of straggler tasks in the job, where the distributed computing system includes a plurality of computing devices; using a computing device to perform a supervised machine-learning algorithm using a set of inputs including performance attributes of the plurality of tasks, where the supervised machine learning algorithm uses labels generated from determination of the set of straggler tasks, the performance attributes include respective attributes of the plurality of tasks observed during performance of the job, and applying the supervised learning algorithm results in identification of a set of rules defining conditions, based on the performance attributes of the plurality of tasks, indicative of which tasks will be straggler tasks in a job; and generating rule data, at the computing device, to describe the set of rules.

Example 18 may include the subject matter of example 17, where analyzing the execution times of the plurality of tasks to determine the set of straggler tasks includes providing the execution times as inputs to an unsupervised machine learning algorithm.

Example 19 may include the subject matter of example 18, where the unsupervised machine learning algorithm includes a clustering algorithm, results of the clustering algorithm cluster the plurality of tasks into a plurality of clusters based on the respective execution times of the tasks, and the labels correspond to the plurality of clusters.

Example 20 may include the subject matter of example 19, where analyzing the execution times of the plurality of tasks to determine the set of straggler tasks further includes identifying a single one of the plurality of clusters as representing the set of straggler tasks.

Example 21 may include the subject matter of example 19, where analyzing the execution times of the plurality of tasks to determine the set of straggler tasks further includes identifying two or more of the plurality of clusters as representing the set of straggler tasks.

Example 22 may include the subject matter of any one of examples 19-21, where the clustering algorithm includes a k-means clustering algorithm.

Example 23 may include the subject matter of any one of examples 17-22, where the supervised learning algorithm includes a decision stump induction algorithm.

Example 24 may include the subject matter of example 23, where the decision stump induction algorithm includes: determining, from the performance attributes, all atomic conditions for each task; and combining the atomic conditions to generate all two-atomic-condition combinations for each task, where the set of rules are determined from a search space including the atomic conditions and two-atomic-condition combinations.

Example 25 may include the subject matter of any one of examples 17-24, where the performance attributes include performance counter attributes and resource assignment attributes.

Example 26 may include the subject matter of example 25, where the resource assignment attributes identify attributes of a respective computing device in the distributed computing system allocated to the corresponding task.

Example 27 may include the subject matter of any one of examples 25-26, where the performance counter attributes include one or more of central processing unit (CPU) rate, canonical memory usage, assigned memory, unmapped page cache, total page cache, disk I/O time, and local disk space usage.

Example 28 may include the subject matter of any one of examples 17-27, where the rule data includes an automatically-generated, human-readable description of each of the set of rules.

Example 29 may include the subject matter of any one of examples 17-28, where the rule data includes machine parsable code to be processed to direct assignment of tasks in a future performance of a job in a distributed computing system.

Example 30 may include the subject matter of example 29, where the future performance of a job in a distributed computing system includes future performance of the job including the plurality of tasks.

Example 31 may include the subject matter of example 29, where the future performance of the job utilizes a different plurality of computing devices.

Example 32 may include the subject matter of any one of examples 17-31, where a portion of the labels label tasks in the plurality of tasks as straggler tasks and another portion of the labels label other tasks in the plurality of tasks as non-straggler tasks.

Example 33 is a system including means to perform the method of any one of examples 17-32.

Example 34 is a system including at least one processor, at least one memory element, an unsupervised machine-learning module, and a supervised machine-learning module. The unsupervised machine-learning module may be executable by the at least one processor, to: receive a first set of inputs identifying execution times of a plurality of tasks of a job completed using a distributed computing system including a plurality of devices; apply an unsupervised clustering algorithm to the first set of inputs to generate a plurality of clusters based on the execution times, where each of the plurality of clusters includes a at least one of the plurality of tasks; designating at least a particular one of the plurality of clusters as representing straggler tasks within the job; and generating labels corresponding to each of the plurality of tasks, where the labels designate tasks in the particular cluster as straggler tasks. A supervised machine-learning module, may be executable by the at least one processor to: receive the labels and a second set of inputs including performance attributes of the plurality of tasks, where the performance attributes include respective attributes of the plurality of tasks observed during performance of the job; and apply a decision stump induction algorithm to the second set of inputs, based on the labels, to determine a set of rules, where the set of rules define conditions indicating which tasks will be straggler tasks in a job based on the performance attributes.

Example 35 may include the subject matter of example 34, further including one or more computer-executed monitor elements to monitor performance of the plurality of tasks and generate monitoring data identifying the execution times and performance attributes.

Example 36 may include the subject matter of any one of examples 34-35, further including the plurality of devices.

Example 37 may include the subject matter of example 36, where the plurality of devices include heterogeneous devices.

Example 38 may include the subject matter of any one of examples 34-37, where the system further includes a rule data generator to generate rule data describing the set of rules.

Example 39 may include the subject matter of example 38, further including a job manager is executable to orchestrate the plurality of tasks on the plurality of device.

Example 40 may include the subject matter of example 39, where the job manager is further to receive the rule data and automate assignment of tasks to devices in a subsequent distributed computing job based on the set of rules.

Example 41 may include the subject matter of any one of examples 38-40, further including a graphical user interface module to generate a presentation including a human readable description of the set of rules Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
analyze respective execution times of a plurality of tasks in a job performed in a distributed computing system to determine a subset of the plurality of tasks comprising a set of straggler tasks in the job, wherein the distributed computing system comprises a plurality of computing devices;
perform a supervised machine-learning algorithm using a set of inputs comprising performance attributes of the plurality of tasks, wherein the supervised machine learning algorithm uses labels generated from determination of the set of straggler tasks, the performance attributes comprise respective attributes of the plurality of tasks observed during performance of the job, and applying the supervised learning algorithm results in identification of a set of rules defining conditions, based on the performance attributes of the plurality of tasks, indicative of which tasks will be straggler tasks in a future job; and
generate rule data to describe the set of rules.

2. The at least one non-transitory machine accessible storage medium of claim 1, wherein analyzing the execution times of the plurality of tasks to determine the set of straggler tasks comprises providing the execution times as inputs to an unsupervised machine learning algorithm.

3. The at least one non-transitory machine accessible storage medium of claim 2, wherein the unsupervised machine learning algorithm comprises a clustering algorithm, results of the clustering algorithm cluster the plurality of tasks into a plurality of clusters based on the respective execution times of the tasks, and the labels correspond to the plurality of clusters.

4. The at least one non-transitory machine accessible storage medium of claim 3, wherein analyzing the execution times of the plurality of tasks to determine the set of straggler tasks further comprises identifying a single one of the plurality of clusters as representing the set of straggler tasks.

5. The at least one non-transitory machine accessible storage medium of claim 3, wherein analyzing the execution times of the plurality of tasks to determine the set of straggler tasks further comprises identifying two or more of the plurality of clusters as representing the set of straggler tasks.

6. The at least one non-transitory machine accessible storage medium of claim 3, wherein the clustering algorithm comprises a k-means clustering algorithm.

7. The at least one non-transitory machine accessible storage medium of claim 1, wherein the supervised learning algorithm comprises a decision stump induction algorithm.

8. The at least one non-transitory machine accessible storage medium of claim 7, wherein the decision stump induction algorithm comprises:
determining, from the performance attributes, all atomic conditions for each task; and
combining the atomic conditions to generate all two-atomic-condition combinations for each task, wherein the set of rules are determined from a search space comprising the atomic conditions and two-atomic-condition combinations.

9. The at least one non-transitory machine accessible storage medium of claim 1, wherein the performance attributes comprise performance counter attributes and resource assignment attributes.

10. The at least one non-transitory machine accessible storage medium of claim 9, wherein the resource assignment attributes identify attributes of a respective computing device in the distributed computing system allocated to the corresponding task.

11. The at least one non-transitory machine accessible storage medium of claim 9, wherein the performance counter attributes comprise one or more of central processing unit (CPU) rate, canonical memory usage, assigned memory, unmapped page cache, total page cache, disk I/O time, and local disk space usage.

12. The at least one non-transitory machine accessible storage medium of claim 1, wherein the rule data comprises an automatically-generated, human-readable description of each of the set of rules.

13. The at least one non-transitory machine accessible storage medium of claim 1, wherein the rule data comprises machine parsable code to be processed to direct assignment of tasks in a future performance of a job in a distributed computing system.

14. The at least one non-transitory machine accessible storage medium of claim 13, wherein the future performance of a job in a distributed computing system comprises future performance of the job comprising the plurality of tasks.

15. The at least one non-transitory machine accessible storage medium of claim 13, wherein the future performance of the job utilizes a different plurality of computing devices.

16. The at least one non-transitory machine accessible storage medium of claim 1, wherein a portion of the labels label tasks in the plurality of tasks as straggler tasks and another portion of the labels label other tasks in the plurality of tasks as non-straggler tasks.

17. A method comprising:
using a computing device to analyze respective execution times of a plurality of tasks in a job performed in a distributed computing system to determine a subset of the plurality of tasks comprising a set of straggler tasks in the job, wherein the distributed computing system comprises a plurality of computing devices;
using the computing device to perform a supervised machine-learning algorithm using a set of inputs comprising performance attributes of the plurality of tasks, wherein the supervised machine learning algorithm uses labels generated from determination of the set of straggler tasks, the performance attributes comprise respective attributes of the plurality of tasks observed during performance of the job, and applying the supervised learning algorithm results in identification of a set of rules defining conditions, based on the performance attributes of the plurality of tasks, indicative of which tasks will be straggler tasks in a future job; and
generating rule data, at the computing device, to describe the set of rules.

18. A system comprising:
at least one processor;
at least one memory element;
an unsupervised machine-learning module, executable by the at least one processor, to:
receive a first set of inputs identifying execution times of a plurality of tasks of a job completed using a distributed computing system comprising a plurality of devices;
apply an unsupervised clustering algorithm to the first set of inputs to generate a plurality of clusters based on the execution times, wherein each of the plurality of clusters comprises a at least one of the plurality of tasks;
designating at least a particular one of the plurality of clusters as representing straggler tasks within the job; and
generating labels corresponding to each of the plurality of tasks, wherein the labels designate tasks in the particular cluster as straggler tasks; and
a supervised machine-learning module, executable by the at least one processor to:
receive the labels and a second set of inputs comprising performance attributes of the plurality of tasks, wherein the performance attributes comprise respective attributes of the plurality of tasks observed during performance of the job; and
apply a decision stump induction algorithm to the second set of inputs, based on the labels, to determine a set of rules, wherein the set of rules define conditions indicating which tasks will be straggler tasks in a future job based on the performance attributes.

19. The system of claim 18, further comprising one or more computer-executed monitor elements to monitor performance of the plurality of tasks and generate monitoring data identifying the execution times and performance attributes.

20. The system of claim 18, wherein the plurality of devices comprise heterogeneous devices.

* * * * *